United States Patent Office 2,742,197
Patented Apr. 17, 1956

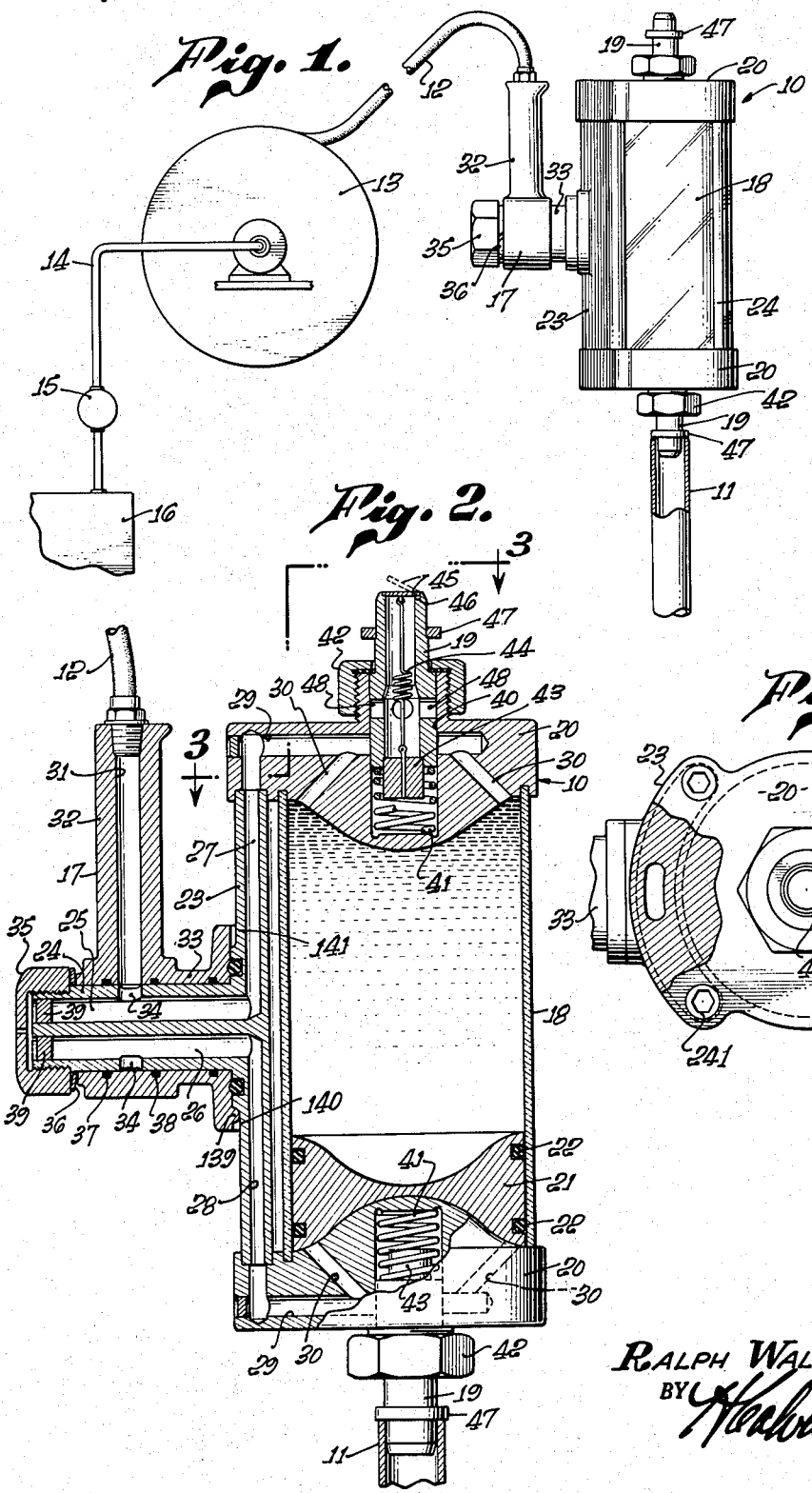

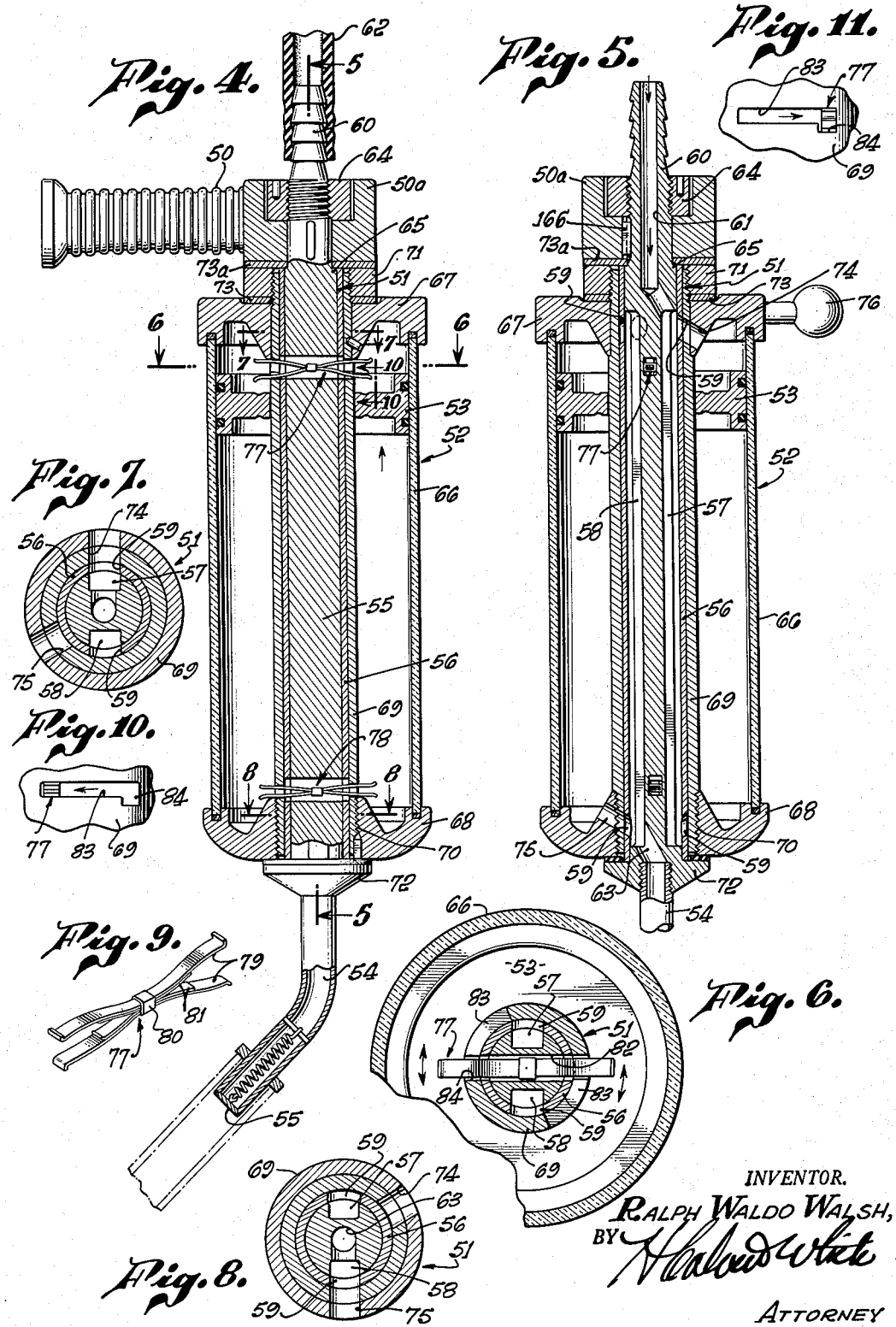

2,742,197

LIQUID METERING APPARATUS

Ralph Waldo Walsh, Westminster, Calif.

Application April 6, 1953, Serial No. 347,067

16 Claims. (Cl. 222—249)

This invention relates to improved apparatus for metering and dispensing accurately measured charges of a liquid. In certain respects, the present apparatus is especially adapted for metering and dispensing lubricating oil at a service station.

Metering apparatus embodying this invention is of the positive displacement type, in which each charge of liquid is very accurately and precisely measured by actually filling it into and then dispensing it from a measuring chamber. A major object of the invention is to provide apparatus adapted for this direct type of measurement, and yet which is constructed to eliminate any loss of time in the measurement operation. As will appear, the apparatus is so designed that, while one charge of liquid is being dispensed, the next successive charge is being automatically measured. To simplify the structure and operation of the apparatus, it may be so constructed that the force for dispensing each charge of liquid is supplied by the pressure of the liquid which is to form the next successive charge.

The apparatus may include means forming a pair of metering chambers and including movable wall means acting by movement in a pair of reverse directions to inversely vary the dimensions of the chambers. Preferably, the movable wall means comprise a piston contained within a cylinder and forming the two metering chambers at its opposite sides. During a metering operation, liquid under pressure is admitted into one of the chambers, to actuate the piston or other movable means in a direction allowing one chamber to fill, and forcing a measured charge from the other chamber.

The delivery of liquid to the apparatus is controlled by valve means operable to selectively admit liquid to, or discharge it from, each of the two chambers. Preferably, these valve means are actuated automatically by movement of the chambers, or a cylinder forming the chambers, between two predetermined positions relative to a support or handle section of the device. The movement between these two positions may be rotational in character, the rotation in one form of the invention being about the axis of the cylinder, and in a second form being about an axis extending transversely of the cylinder axis. If desired, separate outlets may be provided for the two chambers, in which case the movement of the chambers between their two different discharging positions may act to shift the two outlets between discharging and retracted positions.

A further feature of the invention resides in the provision of means for preventing the discharging of less than a complete metered charge of liquid upon each actuation of the device. More specifically, I provide locking means acting upon each delivery to retain the valve means against reversal until a complete charge of liquid has been discharged. These locking means may comprise latch or detent means automatically releasable by the piston as it reaches the end of a stroke.

The above and other features and objects of the present invention will be better understood from the following detailed description of the typical embodiments illustrated in the accompanying drawings, in which:

Fig. 1 is a side partially schematic view of a lubricating oil metering and dispensing system embodying the invention;

Fig. 2 is an enlarged mostly sectional view of the metering and dispensing device of Fig. 1;

Fig. 3 is a fragmentary view taken on line 3—3 of Fig. 2;

Fig. 4 is an axial sectional view of a second form of meter embodying the invention;

Figs. 5 and 6 are sections taken on lines 5—5 and 6—6 respectively of Fig. 4;

Figs. 7 and 8 are sections taken on lines 7—7 and 8—8 respectively of Fig. 4;

Fig. 9 is a perspective view of the spring detent unit; and

Figs. 10 and 11 are developed views of the spring detent and its slot, taken on line 10—10 of Fig. 4, with Fig. 10 showing the detent in unlocked position, and Fig. 11 showing the detent in locked position.

The metering and dispensing system of Fig. 1 is adapted for dispensing metered charges (typically quarts) of lubricating oil at a service station. The metering device proper is shown at 10, and is adapted to be moved to a position for despensing oil into the crank case filling spout 11 of an automobile. For permitting movement of metering unit 10 to a dispensing location, oil under pressure is supplied to the unit through a flexible hose 12, which may be windable about a rotatable automatic takeup reel 13. The oil is delivered to hose 12 through a line 14 from pump 15, which takes its suction from an oil reservoir 16.

Metering unit 10 includes a handle section 17 to be held by an operator, a metering cylinder 18 mounted to handle 17 for inverting rotation between two dispensing positions, and a pair of discharge spouts 19 projecting from opposite ends of cylinder 18 and selectively movable by the cylinder rotation into the active position of the bottom spout in Fig. 1. Cylinder 18 may be formed of transparent material, such as glass, to permit viewing of the oil being dispensed by the device. The opposite ends of cylinder 18 are closed by a pair of identical cylinder heads 20, within which the spouts 19 are mounted.

A metering piston 21 is movable axially within cylinder 18 between the full-line and broken-line positions of Fig. 2 in which it engages the two heads respectively. Piston 21 may be sealed with respect to cylinder 18 by a pair of rubber O-rings 22. The opposite sides of piston 21 are preferably cavitated inwardly as shown, with the cylinder heads 20 being shaped in correspondence with and adapted to project into the piston cavities. The cylinder 18 is so dimensioned as to hold exactly a predetermined charge of oil, typically a quart, when the piston is in one of its head engaging positions, so that movement of the piston from that position to engagement with the opposite cylinder head acts to dispense a desired charge of oil from one of the spouts 19.

Oil is supplied to opposite ends of the cylinder through an arcuately curved saddle-like member 23, which extends axially between heads 20 at one side of the cylinder 18. This member 23 may be curved in correspondence with the outer surface of cylinder 18, as best indicated in Fig. 3. Heads 20 are tightly clamped against opposite end of the cylinder and member 23 by a number of elongated bolts 241 extending axially through and between, and interconnecting, heads 20.

The arcuately curved fluid supply member 23 carries an externally cylindrical portion 24 projecting transversely of cylinder 18 at its longitudinal center, and containing a pair of fluid supply passages 25 and 26 communicating with passages 27 and 28 in the saddle-like portion of the member. Passages 27 and 28 direct incoming oil or other fluid into passages 29 in the cylinder heads, from which the fluid flows through passages 30 into the cylinder. Fluid is supplied to passages 25 and 26 in projection 24 through a vertically extending passage 31 which extends through an upstanding portion 32 of handle 17, and connects at one end with supply hose 12.

In addition to its upstanding portion 32, handle element 17 has a tubular transversely extending portion 33, received about and having a bore corresponding to the diameter of projection 24, to journal projection 24 for rotation about a horizontally extending axis within the handle. Projection 24 contains a pair of diametrically opposed fluid inlet ports 34, communicating respectively with passages 25 and 26, and selectively registrable with handle passage 31 to selectively admit fluid from the handle to opposite ends of the cylinder. As will be understood, with portion 32 of the handle extending vertically, one of the ports 34 registers with handle passage 31 when cylinder 18 is in one vertically extending position, while the second port 34 registers with passage 31 when cylinder 18 is in an inverted position.

Handle element 17 is retained on projection 24 by an outer cap 35 attached to the end of the projection. A spring 36 may be interposed between cap 35 and the handle element to urge the handle toward saddle member 23. Seal rings 37 and 38 may be positioned between the handle element and projection 24, and between the handle element and saddle member 23, to form annular fluid seals preventing the leakage of fluid flowing between the handle element and the projection. Passages 25 and 26 within projection 24 may be closed at their outer ends by a pair of plugs 39. The cylinder unit is releasably retainable by a spring pressed detent 139 in each of its two dispensing positions relative to handle 17. For example, in the position of Fig. 2, detent 139 is receivable within a recess or notch 140 in member 23, as shown, whereas in an inverted position of the cylinder, the detent is received within a recess 141 which is offset 180° from recess 140.

Each of the spouts 19 is tubular, as best seen in the upper portion of Fig. 2, and is slidably or axially movable within a guiding axial bore 40 in the corresponding cylinder head 20. These spouts are urged axially outwardly relative to the cylinder head by springs 41, with the outward movement of the spouts being limited by annular retaining caps or rings 42 threaded onto the heads. The inner end of each spout 19 is closed by a plug 43, to which is anchored a first end of a spring 44, whose other end is attached to a flapper valve 45 at the discharge end of the spout. As will be understood, valve 45 is normally urged to its illustrated full-line closed position by spring 44, but will swing outwardly about its hinge 46 to allow the outward flow of oil under pressure. Valve 45 acts merely as a closure for preventing dust and other clogging impurities from entering the spout when oil is not being dispensed. Each of the spouts has an annular flange 47 outwardly beyond retaining cap 42, and of a diameter to engage and be deflected by the end of filling spout 11 during a filling operation. The tubular side wall of each spout 19 contains a number of lateral ports 48, which do not normally communicate with fluid supply passage 29 in the cylinder head, but which move into registry with that passage upon axially inward movement of the spout.

When the illustrated apparatus is used for dispensing oil at a service station, hose 12 is of course normally maintained in wound condition about reel 13, and meter unit 14 is positioned on some type of easily accessible supporting structure. An operator fills a quart of oil into an automobile crank case, by merely holding the upstanding portion of handle 17, inverting cylinder 18 to a position in which piston 21 is at the upper end of the cylinder, and then inserting the lowermost spout 19 into the filling spout 11 of the automobile. As flange 47 of the dispenser spout engages the upper end of automobile spout 11, the filling spout is deflected upwardly relatively to the cylinder, to move port 48 into registry with cylinder head passage 29, and allow the discharge of oil from beneath piston 21 through the lower spout 19 and into the automobile. The piston is forced downwardly to effect such fluid ejection by the force of fluid delivered under pressure to the upper end of the cylinder. In this connection, it is noted that the fluid supply passage of handle 32 is always in registry with the passages leading to the upper cylinder head, so that fluid delivered to the cylinder always tends to urge the piston downwardly in a dispensing direction. After one charge or quart of oil has been dispensed from the device, cylinder 18 may be rotated relative to the handle to an inverted position in which the second spout is insertable into the crank case filling spout of the automobile, so that the piston may again be moved downwardly to dispense a second charge of oil into the automobile. Thus each operation of the device acts to dispense a metered charge of fluid from the chamber formed within cylinder 18 at one side of the piston, and to fill a second metered charge of fluid into a second chamber formed at the other side of piston 21 within the cylinder.

Figs. 4 to 11 show a variational form of the invention in which the metering cylinder is rotatable about its own axis between the two dispensing positions, rather than about a transverse axis. This form of the invention includes a handle 50, from the end of which projects a shaft assembly 51. A metering cylinder 52 is carried about shaft assembly 51, and is rotatable relative thereto about the axis of the shaft and cylinder. Movement of piston 53 within cylinder 52 acts to discharge metered charges of oil or other liquid from the device through discharge spout 54, past a spring urged valve 155 closing the end of the spout.

The shaft assembly may be circularly formed of an inner elongated core member 55, and an outer cylindrical sleeve 56 extending about the core. The portion of the core member received within sleeve 56 is externally cylindrical and in engagement with the sleeve, except at the locations of a pair of fluid passing channels 57 and 58 extending longitudinally along the core member at diametrically opposite locations. These channels or passages are closed along their entire extents by sleeve 56, except at the ends of the channels, where the sleeve contains openings 59 leading downwardly from the various passage ends.

At one of its ends, the inner core member 55 of the shaft assembly has a reduced dimension portion 60 which is connected to the end of handle 50, and which contains a fluid supply passage 61 communicating with a connected fluid supply hose 62. Passage 61 leads the inlet fluid to be metered into a first one of the shaft passages 57, from which the fluid flows into the cylinder in a manner later to be described. The second passage 58 in the shaft comprises an outlet passage, through which fluid discharged from the cylinder flows to an angular end passage 63 leading into the discharge spout 54.

The reduced dimension end portion 60 of the shaft assembly extends through an opening in the upper end of handle 50, and is fastened to the handle by a retaining nut 64. This nut is threaded onto the reduced dimension portion 60 of the shaft assembly, and tightens the upper portion of handle 50 against an annular shoulder 65 of the shaft assembly. The handle and shaft assembly may be retained against relative rotation by a key 166, extending into registering keyways in the engaged portions of the handle and shaft.

Cylinder 52 includes a cylindrical preferably transparent outer wall 66, and a pair of cylinder heads 67 and 68 at opposite ends of wall 66. These parts are carried by and about an inner cylindrical wall 69 of the cylinder, which is rotatably carried about the outer sleeve 56 of the shaft assembly. The cylinder parts may be attached to end wall 68 by means of a threaded connection at 70 between one of the heads and inner wall 69, and a nut 71 threadedly connected onto the opposite end of inner wall 69 and tightened against the second of the cylinder heads. The cylinder assembly is retained against axial movement on shaft assembly 51, by confinement between the end portion 50a of handle 50, and an outer enlarged diameter portion 72 of inner core member 55 of the shaft assembly. A pair of brass thrust bearings or washers 73 and 73a may be positioned between the rotatable cylinder assembly and handle portion 50a and enlargement 72 respectively.

At each of its ends, the cylinder assembly contains two circularly offset radially extending fluid passages 74 and 75, for selectively admitting fluid pressure to or discharging it from the corresponding end of the cylinder. Each of these passages extends radially through an inner portion of one of the cylinder heads, and through the inner wall element 69 of the cylinder assembly. The passage 74 at each end of the cylinder assembly is adapted to communicate with one of the openings 59 of the shaft assembly 51, to admit pressure fluid from passage 57 of the shaft assembly into the cylinder. The second passage 75 at each end of the cylinder assembly communicates through a second of the openings 59 in the shaft assembly with fluid outlet passage 58 of the shaft assembly. The passages 74 and 75 in the ends of the cylinder assembly are so positioned and circularly offset that, in one rotary position of the cylinder assembly, fluid is admitted from passage 57 into one end of the cylinder, and is discharged from the opposite end of the cylinder into passage 58 for delivery to the spout. In a second rotary position of the cylinder, the connections of the supply and discharge passages 57 and 58 are reversed. Preferably, the cylinder assembly rotates through an angle of about 60 degrees, in moving from one of these positions to the other. For actuating the cylinder assembly between these positions, head 67 of the cylinder carries a laterally projecting knob 76, to be actuated by one hand of a user, while the other hand holds depending handle 50.

For preventing rotation of the cylinder between its two positions except after discharge of a complete charge of fluid from the cylinder, I provide a pair of spring detent units 77 and 78 carried by the shaft assembly near its opposite ends. Each of these spring detent units includes a pair of elongated generally parallel leaf springs 79, whose longitudinally central portions are fastened together by a strap or clamp 80. The ends of leaf springs 79 diverge progressively outwardly from their interconnected central portions, and normally tend to move relatively apart as a result of the resilience of the spring material. These ends are compressible relatively toward one another against the tendency of the spring material, whose resilience may be supplemented by a pair of short leaf spring 81 backing up the longitudinally central portions of the spring 79.

The two spring detent units 77 and 78 extend through a pair of diametrical passages 82 formed in the two parts of shaft assembly 51 near the opposite ends of the shaft assembly. The ends of the spring units project radially outwardly through arcuate transverse elongated slits 83 formed in the inner wall 69 of the cylinder assembly. At one end of each of these slits 83, wall 69 of the cylinder contains notches 84 projecting axially beyond the rest of the slit in a direction toward piston 53.

As will be understood, the resiliency of leaf springs 79 tends to urge the axially inner one of the leaf spring of each spring unit into the corresponding notches 84, to thereby lock the cylinder against rotation relative to the shaft assembly. The notches 84 at each end of the cylinder are so positioned that reception of the corresponding spring unit within those notches acts to retain the cylinder in one of the previously mentioned rotary positions of the cylinder, to admit fluid to one end of the cylinder and discharge it from the other end. The notches at the opposite end of the cylinder are so positioned that reception of a spring unit within those notches locks the cylinder in its second rotary position, in which the fluid connections to the cylinder are reversed.

The outer ends of spring 79 project into the path of piston 53, and are deflectible by the piston out of their corresponding notches 84 by the final stages of movement of the piston in its two directions of movement. The notches 84 are so positioned that each of the spring units 77 and 78 is operable, when received in the corresponding notches, to retain the cylinder assembly in the rotary position in which fluid is discharged from the end of the cylinder at which that particular spring unit is positioned, and is admitted to the opposite end of the cylinder. Thus, each spring unit is operable to retain the cylinder in the position in which the piston is being forced by pressure fluid toward the end of the cylinder at which that particular spring unit is located. When the piston reaches the end of its travel in that direction, it engages the locking spring unit and deflects it out of the engaged notches 84, to permit rotation of the cylinder to its second position for actuating the piston in the reversed direction. When the cylinder has been turned to that second position, the spring unit at the opposite end of the cylinder slips into the notches 84 with which it coacts, to again lock the cylinder against rotation, until reversed movement of the piston has discharged a complete metered charge from the cylinder, and then finally engages the locking spring unit to release it for permitting rotation of the cylinder back to its other position.

In using the device, an operator merely holds the unit in his right hand by handle 50, places spout 54 over the filling spout of the automobile, and then turns cylinder 52 through 60 degrees from whichever position it may be in to the other position. This rotation places fluid supply passage 57 in communication with the end of the cylinder at which the piston is located, and places outlet passage 58 in communication with the other end of the cylinder. As a result, the pressure of the fluid in passage 57 actuates the piston from one end of the cylinder to the other, and forces a metered charge of liquid from spout 54. During this piston movement the cylinder is maintained against rotation relative to the shaft assembly 51 by the locking spring unit 77 or 78 which is located at the end of the cylinder toward which the piston is moving. As the piston reaches the end of its stroke, it engages the locking spring unit, to deflect the spring ends out of notches 84, and thus permit rotation of the cylinder to the other rotary position when it is desired to discharge the next successive charge of fluid from the device.

Where the claims specify that the valve means (or "control" or "actuating" means) of the device are manually actuated, this term is utilized to indicate that the valve means are actuated by the operator, rather than by any type of automatic valving arrangement which might automatically reverse the valves at the end of each piston stroke. The term manual actuation as thus used is intended to include an arrangement in which the operator might actuate the valve means indirectly prior to each stroke of the piston, as through a mechanical linkage, electrical valve actuating system, or the like.

I claim:

1. A liquid meter comprising a portable cylinder, a piston in the cylinder separating it into two chambers and movable in a pair of opposite directions by liquid under pressure in the chambers respectively, said piston acting to relatively inversely vary the volumes of said chambers by said movement, outlet means through which metered charges of liquid are forced from said chambers and cylinder by said movement of the piston, inlet means introducing said liquid into the chambers, manually actuable control means operable upon a first manual actuation to admit liquid to one of said chambers and discharge it from the second chamber until said piston has moved through a predetermined range of travel in one direction, said meter being so constructed that the piston then remains stationary until a subsequent manual actuation of said control means following which the piston moves in a reverse direction discharging a charge of liquid from said one chamber and admitting it into said second chamber, a handle carrying said cylinder, and means mounting said cylinder to the handle for relative rotary movement about the cylinder axis, said control means including valve means actuable by said rotary movement of the cylinder to selectively connect said chambers to said inlet and outlet means respectively.

2. A liquid meter comprising a body containing two chambers, wall means in the body separating said chambers and movable in a pair of opposite directions by liquid pressure in the chambers respectively, said wall means acting to relatively inversely vary the volumes of said chambers by said movement, outlet means through which metered charges of liquid are forced from said chambers and body by said movement of the wall means, inlet means introducing said liquid into the chambers, control means operable upon a first actuation to admit liquid to one of said chambers and discharge it from the second chamber until said wall means have moved through a predetermined range of travel in one direction, said meter being so constructed that the wall means then remain stationary until a subsequent manually controlled actuation of said control means following which the wall means move in a reverse direction discharging a charge of liquid from said one chamber and admitting it into said second chamber, manually operated means operable to actuate said control means while said wall means remain stationary, and means preventing a second actuation of said control means by said manually controlled actuating means until the wall means have moved through their entire predetermined range of movement as a result of a previous actuation of the control means.

3. A liquid meter comprising a body containing two chambers, wall means in the body separating said chambers and movable in a pair of opposite directions by liquid pressure in the chambers respectively, said wall means acting to relatively inversely vary the volumes of said chambers by said movement, outlet means through which metered charges of liquid are forced from said chambers and body by said movement of the wall means, inlet means introducing said liquid into the chambers, manually actuable control means operable upon a first manual actuation to admit liquid to one of said chambers and discharge it from the second chamber until said wall means have moved through a predetermined range of travel in one direction, said meter being so constructed that the wall means then remain stationary until a subsequent manual actuation of said control means following which the wall means move in a reverse direction discharging a charge of liquid from said one chamber and admitting it into said second chamber, a support movably carrying said body, said control means including valve means operable by movement of the body relative to said support, and means preventing said movement of the body and thereby preventing a second actuation of said control means until the wall means have moved through their entire range of movement as a result of a previous body movement and actuation of the control means.

4. A liquid meter comprising a handle, a cylinder carried by and movable relative to said handle, a movable piston within said cylinder forming two chambers therein, outlet means through which metered charges of liquid are forced from said cylinder chambers by said piston, inlet means introducing liquid into the chambers, manually actuable control valve means operable upon a first actuation to admit liquid to one of said chambers and discharge it from the second until said piston has moved through a predetermined range of movement, said meter being so constructed that the piston then remains stationary until a subsequent manual actuation of said control means following which the piston moves in a reverse direction discharging a charge of liquid from said one chamber and admitting it into said second chamber, said control means including valve means actuable by movement of said cylinder relative to said handle to selectively reverse the connections to said chambers, detent means locking said cylinder against valve actuating movement relative to said handle after each valve reversing movement of the cylinder and until the piston has then moved through its complete range of movement within the cylinder, and means releasing said detent means in response to completion of the piston movement through said range.

5. A liquid meter as recited in claim 4, in which said cylinder is mounted to said handle for rotary movement relative thereto about the axis of the cylinder.

6. A liquid meter comprising a cylinder, a movable piston within said cylinder forming two chambers therein, outlet means through which metered charges of liquid are forced from said cylinder chambers by said piston, inlet means introducing liquid into the chambers, control valve means operable upon a first actuation to admit liquid to one of said chambers and discharge it from the second until said piston has moved through a predetermined range of movement, said meter being so constructed that the piston then remains stationary until a subsequent manually controlled actuation of said control means following which the piston moves in a reverse direction discharging a charge of liquid from said one chamber and admitting it into said second chamber, manually operated means operable to actuate said control valve means while said wall means remain stationary, holding means acting after each actuation of said control valve means to lock said valve means against a subsequent actuation until the piston has moved through its complete range of movement in the cylinder, and means for releasing said holding means in response to completion of the piston movement through said range.

7. A liquid meter as recited in claim 6, in which said last recited means comprise means engageable by the piston at the end of its movement through said range and actuable when thus engaged to release said holding means.

8. A liquid meter comprising a cylinder, a movable piston within the cylinder dividing it into two chambers, conduit means containing liquid inlet and outlet passage means selectively communicable with said chambers, manually actuable control valve means operable upon a first actuation to admit liquid from said inlet passage means to one of said chambers and to discharge liquid from the second chamber through said outlet passage means until said piston has moved through a predetermined range of movement, said meter being so constructed that the piston remains stationary after moving through said range and until a subsequent manual actuation of said valve means following which the piston moves in a reverse direction discharging a charge of liquid from said one chamber and admitting it into said second chamber, said conduit means extending at least partially within said cylinder to a location at which the liquid in the cylinder is received about said conduit means.

9. A liquid meter comprising a cylinder, a movable piston within the cylinder, dividing it into two chambers, a member having a portion about which the cylinder is disposed and relative to which the cylinder is manually movable, said member containing inlet and outlet passage means at the inside of the cylinder, control valve means actuable by said movement of the cylinder relative to said member, said valve means being operable upon a first actuation to admit liquid from said inlet passage means to one of said chambers and to discharge liquid from the second chamber through said outlet passage means until said piston has moved through a predetermined range of movement, said meter being so constructed that the piston remains stationary after moving through said range and until a subsequent manual actuation of said cylinder relative to said member following which the piston moves in a reverse direction discharging a charge of liquid from said one chamber and admitting it into said second chamber, detent means at the inside of said cylinder locking said cylinder against valve actuating movement relative to said member after each valve reversing movement of the cylinder and until the piston has moved through substantially its complete range of movement within the cylinder, and means actuable by said piston for releasing said detent means in response to substantial completion of the piston movement through said range.

10. A liquid meter as recited in claim 9, in which said member extends axially through said cylinder and mounts the cylinder for rotary movement about essentially its axis.

11. A liquid meter as recited in claim 10, in which said cylinder has a tubular radially inner wall movably carried about said member, said detent means comprising elongated leaf spring units extending transversely through said members and said inner wall of the cylinder near opposite ends of the cylinder and constructed to be compressed axially of the cylinder and released from holding condition by said compression, said detent releasing means comprising portions of said leaf spring units extending into said cylinder in the path of the piston for compressing said units in accordance with piston movements.

12. A liquid meter as recited in claim 11, in which said member contains transverse passages through which said units extend and rotatably keying the units to the member, and said tubular wall contains essentially arcuate slots movably receiving said units and having axially enlarged notch portions into which said units are expansible and from which they are displaceable by said piston induced compression.

13. A liquid meter comprising a cylinder, a movable piston within the cylinder dividing it into two chambers, means containing liquid inlet and outlet passage means selectively communicable with said chambers and at least partially disposed within said cylinder, manually actuable control valve means operable upon a first actuation to admit liquid from said inlet passage means to one of said chambers and to discharge liquid from the second chamber through said outlet passage means until said piston has moved through a predetermined range of movement, said meter being so constructed that the piston remains stationary after moving through said range and until a subsequent manual actuation of said valve means following which the piston moves in a reverse direction discharging a charge of liquid from said one chamber and admitting it into said second chamber, said valve means being contained within said cylinder.

14. A liquid meter comprising a cylinder, a movable piston within the cylinder dividing it into two chambers, means containing liquid inlet and outlet passage means selectively communicable with said chambers and at least partially disposed within said cylinder, manually actuable control valve means operable upon a first actuation to admit liquid from said inlet passage means to one of said chambers and to discharge liquid from the second chamber through said outlet passage means until said piston has moved through a predetermined range of movement, said meter being so constructed that the piston remains stationary after moving through said range and until a subsequent manual actuation of said valve means following which the piston moves in a reverse direction discharging a charge of liquid from said one chamber and admitting it into said second chamber, said first mentioned means comprising a member containing said passage means and extending essentially axially through said cylinder and about which the cylinder is mounted for rotary movement about essentially the axis of the cylinder, said valve means being actuable by said rotary movement of the cylinder relative to said member.

15. A liquid meter comprising a cylinder, a movable piston within the cylinder dividing it into two chambers, means containing liquid inlet and outlet passage means selectively communicable with said chambers and at least partially disposed within said cylinder, manually actuable control valve means operable upon a first actuation to admit liquid from said inlet passage means to one of said chambers and to discharge liquid from the second chamber through said outlet passage means until said piston has moved through a predetermined range of movement, said meter being so constructed that the piston remains stationary after moving through said range and until a subsequent manual actuation of said valve means following which the piston moves in a reverse direction discharging a charge of liquid from said one chamber and admitting it into said second chamber, said first mentioned means comprising a member containing said passage means and extending essentially axially through said cylinder and about which the cylinder is mounted for rotary movement about essentially the axis of the cylinder, said cylinder having an outer cylindrical wall, and having a tubular radially inner wall disposed about and movably engaging said member, said valve means comprising ports in said inner wall of the cylinder and in said member movable into and out of registry by rotary movement of the cylinder about said member, there being a handle connected to a first end of said member, and a discharge spout connected to the opposite end of said member.

16. A liquid meter comprising a cylinder, a movable piston within the cylinder dividing it into two chambers, means containing liquid inlet and outlet passage means selectively communicable with said chambers and at least partially disposed within said cylinder, manually actuable control valve means operable upon a first actuation to admit liquid from said inlet passage means to one of said chambers and to discharge liquid from the second chamber through said outlet passage means until said piston has moved through a predetermined range of movement, said meter being so constructed that the piston remains stationary after moving through said range and until a subsequent manual actuation of said valve means following which the piston moves in a reverse direction discharging a charge of liquid from said one chamber and admitting it into said second chamber, said first mentioned means comprising a member extending through said cylinder and containing said passage means, there being a handle connected to a first end of said member, and a discharge spout connected to the opposite end of said member.

References Cited in the file of this patent

UNITED STATES PATENTS

| | | |
|---|---|---|
| 801,612 | Schramm | Oct. 10, 1905 |
| 1,586,834 | Ormsby | June 1, 1926 |
| 1,782,704 | Woodruff | Nov. 25, 1930 |
| 1,963,646 | Burrell | June 19, 1934 |